United States Patent
Suo et al.

(10) Patent No.: US 8,570,985 B2
(45) Date of Patent: Oct. 29, 2013

(54) METHOD, SYSTEM AND APPARATUS FOR PROCESSING UPLINK SIGNALS

(75) Inventors: Shiqiang Suo, Beijing (CN); Libo Wang, Beijing (CN); Xueming Pan, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 526 days.

(21) Appl. No.: 12/989,613

(22) PCT Filed: Apr. 24, 2009

(86) PCT No.: PCT/CN2009/071457
§ 371 (c)(1),
(2), (4) Date: Oct. 25, 2010

(87) PCT Pub. No.: WO2009/129751
PCT Pub. Date: Oct. 29, 2009

(65) Prior Publication Data
US 2011/0044181 A1 Feb. 24, 2011

(30) Foreign Application Priority Data
Apr. 25, 2008 (CN) .......................... 2008 1 0105070

(51) Int. Cl.
*H04J 3/00* (2006.01)
(52) U.S. Cl.
USPC .......................................................... 370/336
(58) Field of Classification Search
USPC .................................................. 370/330, 336
See application file for complete search history.

(56) References Cited

U.S. PATENT DOCUMENTS

| 7,751,365 | B2 * | 7/2010 | Ikeda .......................... 370/330 |
| 2009/0040973 | A1 | 2/2009 | Iwai et al. |
| 2010/0226295 | A1 | 9/2010 | Sun et al. |

FOREIGN PATENT DOCUMENTS

| CN | 101005308 A | 7/2007 |
| CN | 101043256 A | 9/2007 |
| CN | 101159478 A | 4/2008 |
| CN | 101162987 A | 4/2008 |
| CN | 101197616 A | 6/2008 |
| CN | 101568165 A | 11/2011 |
| KR | 1020080083040 A | 9/2008 |
| WO | 01/67620 A2 | 9/2001 |
| WO | 2007/088854 A1 | 8/2007 |

OTHER PUBLICATIONS

International Search Report for PCT/CN2009/071457 (in English), mailed Aug. 6, 2009; ISA/CN.

(Continued)

*Primary Examiner* — Mark Rinehart
*Assistant Examiner* — Gbemileke Onamuti

(57) ABSTRACT

The present invention discloses a method for processing uplink signal. In this method, when a random access channel of a cell where a user equipment (UE) locates is within an uplink pilot timeslot, the UE determining whether there is a conflict between the random access channel and time-frequency position of an uplink channel quality sounding pilot of the UE; and if there is a conflict, the uplink channel quality sounding pilot will not be transmitted by the UE within the uplink pilot timeslot. The present invention also discloses a system and apparatus for processing uplink signal. By applying the method, system and apparatus of the present invention, the interference to detection performance of the random access channel caused by the uplink channel quality sounding pilot will be avoided, thereby increasing the detection performance of the random access channel.

3 Claims, 5 Drawing Sheets

(56) References Cited

OTHER PUBLICATIONS

3GPP TS 36.211 V8.2.0 (Mar. 2008); Technical Specification; 3rd Generation Partnership Project; Technical Specification Group Radio Acc Netw Evolved Universal Terrestrial Radio Access (E-UTRA); Physical Channels and Modulation (Release 8); 9 pages.
Catt, et al.; "On collision between SRS and PRACH in UpPTS"; 3gPP Draft; R1-082963, 3rd Generation Partnership Project (3GPP); Motible Competence Centre; 650 Route Des Lucioles; F-06921 Sophia-Antipolis Cedes; France; No. Jeju; Aug. 12, 2008; XP050316428.
Texas Instruments; "Interference between Sounding Reference Signal and Random Access Preamble"; 3GPP Draft; R1-074133; 3rd Generation Partnership Project (3GPP); Mobile Competence Centre; 650, Route Des Lucioles; F-06921 Sophia-Antipolis Cedex; France; vol. RAN WG1; No. Shanghai, China; Oct. 2, 2007; XP050107665.
Samsung; "Short RACH in UpPTS"; 3GPP Draft; R1-080040; 3rd Generation Partnership Project (3GPP); Mobile Competence Centre; 650, Route Des Lucioles; F-06921 Sophia-Antipolis Cedex; France; vol. RAN WG1, No.; Sevilla Spain; Jan. 8, 2008; XP050108583.
Catt, et al.; "Sounding reference signals in UpPTS for TDD"; 3GPP Draft; R1-080799; Sounding Reference Signals in UPPTS for TDD; 3rd Generation Partnership Project (3GPP); Mobile Competence Centre; 650, Route Des Lucioles; F-06921 Sophia-Antipolis Cedex; France; vol. RAN WG1; No. Sorrento, Italy; Feb. 5, 2008; XP050109282.
Editor (Ericsson); "Update of 36.211"; 3GPP Draft; R1-074832; 3rd Generation Partnership Project (3GPP); Mobile Competence Centre; 650, Route Des Lucioles; F-06921 Sophia-Antipolis Cedex; France; vol. RAN WG1, No. Korea; Nov. 4, 2007; XP050108291.
Chinese Office Action for Chinese Patent Application No. 200810105070.8, dated Mar. 30, 2010, and English translation thereof.
Supplementary European Search Report for European Patent Application No. 09735649.7, dated Jul. 23, 2012.
Korean Office Action for Korean Patent Application No. 10-2010-7026428, dated Jun. 21, 2012, and English translation thereof.
Mexican Office Action for Mexican Patent Application No. MX/A/2010/011737, dated Jun. 11, 2012, and English translation thereof.
Mexican Office Action for Mexican Patent Application No.MX/A/2010/011737, dated Jan. 15, 2012, and English translation thereof.
Korean Office Action for Korean Patent Application No. 10-2010-7026428, dated Dec. 28, 2012, and English Summary thereof.

* cited by examiner

METHOD, SYSTEM AND APPARATUS FOR PROCESSING UPLINK SIGNALS

CROSS-REFERENCE TO RELATED APPLICATIONS

This application is a U.S. National Stage Application of International application No. PCT/CN2009/071457, filed 24 Apr. 2009. This application claims the benefit of Chinese Application No. 200810105070.8, filed 25 Apr. 2008. The disclosures of the above applications are incorporated herein by reference.

FIELD OF THE INVENTION

The present invention relates to mobile communication technique, and especially relates to a method, system and apparatus for processing uplink signal.

BACKGROUND OF THE INVENTION

Two frame structure types, i.e., frame structure type 1 and frame structure type 2, are defined in current Long Term Evolution (LTE) system. Frame structure type 1 is used in a Frequency Division Dual (FDD) structure, while frame structure type 2 is used in a Time Division Dual (TDD) structure.

FIG. 1 is a schematic diagram of the composition of frame structure type 1 in the existing LTE system. As shown in FIG. 1, each radio frame is 10 ms long and consists of 10 subframes of length 1 ms. Furthermore, each subframe includes two timeslots, and the time length of a timeslot is 0.5 ms.

FIG. 2 is a schematic diagram of the composition of frame structure type 2 in the existing LTE system. As shown in FIG. 2, each radio frame of length 10 ms consists of two half-frames of length 5 ms each. Each half-frame consists of five subframes of length 1 ms. The second subframe of each half-frame is a subframe with three special timeslots, as shown in FIG. 2, including downlink pilot timeslot (DwPTS), guard period (GP) and uplink pilot timeslot (UpPTS). Each of the other subframes includes two timeslots of length 0.5 ms.

Meanwhile, five random access burst structures are defined for the LTE system. A user equipment (UE) can use the five random access burst structures to initiate, on its corresponding random access channel, a random access procedure to a base station of a cell where the UE locates. Parameters corresponding to each of the five random access burst structures are as shown in Table 1, wherein Ts=1/(15000*2048)s.

structure has three parts including Cyclic Prefix (CP), Sequence and Guard Time (GT). CP is mainly used for guaranteeing frequency domain sounding at receiving side, while GT is mainly used for avoiding interference, which may be caused due to time uncertainty of a random access channel, on normal data subframes subsequence to the random access channel.

In the uplink of an LTE system, there are an uplink shared channel and an uplink control channel, and also an uplink channel quality sounding pilot, of which positions are shown in FIG. 4. The uplink control channel distributes symmetrically on two sides of the frequency band of an uplink subframe, which is illustrated in FIG. 4 in slash; the middle part of the frequency band of the uplink subframe shown in FIG. 4 in blank is the uplink shared channel, wherein the area in black is the uplink channel quality sounding pilot. Meanwhile, one or more random access channels can be located in an uplink pilot timeslot (other two timeslots, i.e., DwPTS and GT, are not indicated in FIG. 4) and normal subframes, wherein the normal subframes refer to such as subframe 2, subframe 3 and subframe 4 illustrated in FIG. 4. These random access channels, whose specific frequency domain positions are designated by a base station, distribute randomly within the whole frequency band.

When a random access channel is located in a normal subframe, a random access burst structure configured for the channel can be any of random access burst structures 0-3 as shown in Table 1. These random access burst structures have relatively long length. Accordingly, lengths of CP and GT parts are long, which are usually longer than that of an Orthogonal Frequency Division Multiplexing (OFDM) symbol. As such, when an uplink channel quality sounding pilot of a UE and a random access channel are located in the same frequency, it is allowable for the uplink channel quality sounding pilot and the CP or GT part of the random access channel to be overlapped in frequency domain since the uplink channel quality sounding pilot merely occupies an OFDM symbol. That is, a random access signal and an uplink channel quality sounding pilot can be transmitted in the same frequency at the same time. Since the existence of an uplink channel quality sounding pilot has no impact on Sequence part of a random access burst structure, the detection performance of a random access channel will not be affected.

However, under some circumstances, frequency hopping can be applied for an uplink channel quality sounding pilot of a UE according to certain configuration. That is, the uplink

TABLE 1

Parameters corresponding to each of the five random access burst structures

| Burst structure | Time length | $T_{CP}$ | $T_{SEQ}$ | Sequence length | GT |
|---|---|---|---|---|---|
| 0 | 1 ms | $3152 \times T_s$ | $24576 \times T_s$ | 839 | ≈97.4 us |
| 1 | 2 ms | $21012 \times T_s$ | $24576 \times T_s$ | 839 | ≈516 us |
| 2 | 2 ms | $6224 \times T_s$ | $2 \times 24576 \times T_s$ | 839 (transmit twice) | ≈197.4 us |
| 3 | 3 ms | $21012 \times T_s$ | $2 \times 24576 \times T_s$ | 839 (transmit twice) | ≈716 us |
| 4 | ≈157.3 us | $448 \times T_s$ | $4096 \times T_s$ | 139 | ≈9.4 us |

Here, burst structure 4 can only be used within an uplink pilot timeslot of frame structure type 2, while burst structures 0-3 can be transmitted in normal subframes of frame structure type 1 and frame structure type 2.

FIG. 3 is a schematic diagram of an existing random access burst structure. As shown in FIG. 3, each random access burst channel quality sounding pilot of the UE does not have fixed time-frequency position in different time, and it may be located in different subframe. Then, at a time, the time-frequency position of the uplink channel quality sounding pilot may overlap with a random access channel located in an uplink pilot timeslot of frame structure type 2. Since the only random access burst structure the random access channel located in the uplink pilot timeslot can use is random access burst structure 4 which has a relatively short length, i.e., merely two OFDM symbols, wherein CP or GT part has a length less than one OFDM symbol, there may be a conflict between the random access channel and the uplink channel quality sounding pilot. In this case, the detection performance of the random access channel will be affected if a random access signal and an uplink channel quality sounding pilot are transmitted in the same frequency at the same time. Although a multiplexing method has been proposed in the prior art for solving this problem, a complicated multiplexing configuration for a random access channel and time-frequency position of an uplink channel quality sounding pilot is needed in this method, which is not convenient to implement. Therefore, it is not an ideal way to solve this problem.

SUMMARY OF THE INVENTION

In view of the above, the primary object of the present invention is to provide a method for processing uplink signal, in order to improve detection performance of a random access channel.

Another object of the present invention is to provide apparatus for processing uplink signal, in order to improve detection performance of a random access channel.

Yet another object of the present invention is to provide a system for processing uplink signal, in order to improve detection performance of a random access channel.

In order to attain the above mentioned objects, technical schemes of the present invention are implemented as follows.

A method for processing uplink signal includes:
when a random access channel of a cell where a user equipment (UE) locates is within an uplink pilot timeslot, the UE determining whether there is a conflict between the random access channel and time-frequency position of an uplink channel quality sounding pilot of the UE; and
if there is a conflict, the uplink channel quality sounding pilot will not be transmitted by the UE within the uplink pilot timeslot.

Apparatus for processing uplink signal includes:
a determining unit, configured for determining whether there is a conflict between a random access channel of a cell where the apparatus locates and time-frequency position of an uplink channel quality sounding pilot of the apparatus when the random access channel is within an uplink pilot timeslot, and informing a determination result to a transmitting unit;
the transmitting unit, configured for not transmitting the uplink channel quality sounding pilot within the uplink pilot timeslot when the determination result is that there is a conflict.

A system for processing uplink signal includes:
a base station, configured for configuring random access channels for underling cells of the base station and configuring an uplink channel quality sounding pilot for each user equipment (UE) within the underling cells, broadcasting configuration of the random access channels, and informing configuration of uplink channel quality sounding pilots to corresponding UEs;
each of the UEs is configured for determining whether there is a conflict between a random access channel of a cell where the UE locates and time-frequency position of an uplink channel quality sounding pilot of the UE when the random access channel of the cell where the UE locates is within an uplink pilot timeslot, and not transmitting the uplink channel quality sounding pilot of the UE within the uplink pilot timeslot if there is a conflict.

It is obvious that, by adopting the technical scheme provided in the present invention, a user equipment (UE) will determine whether there is a conflict between a random access channel and time-frequency position of an uplink channel quality sounding pilot of the UE when the random access channel of the cell where the UE locates is within an uplink pilot timeslot, and if there is a conflict, the uplink channel quality sounding pilot will not be transmitted by the UE. In this way, the interference to the detection performance of the random access channel caused by the uplink channel quality sounding pilot will be avoided, that is, the detection performance of the random access channel will be raised.

BRIEF DESCRIPTION OF DRAWINGS

In order to make the above mentioned and other features of the present invention and its merits clearer to those skilled in the art, exemplary embodiments of the present invention will be described in detail hereinafter with reference to attached drawings. In the attached drawings.

DETAILED DESCRIPTION OF THE INVENTION

In order to make the purpose, technical scheme and merits of the present invention clearer, the present invention is further explained with reference to the attached drawings and embodiments.

For solving the problem of the prior art, that is, a random access channel of a cell where a UE locates and time-frequency position of an uplink channel quality sounding pilot of the UE are the same within an uplink pilot timeslot due to causes such as frequency hopping of the uplink channel quality sounding pilot, which may interfere with the detection performance of the random access channel, an uplink signal processing method is put forward in the present invention. On considering that the UE can exactly know the specific time-frequency position of the random access channel of the cell where the UE itself locates, once it is detected by the UE in the method of the present invention that there is a conflict between the random access channel of the cell where the UE locates and the time-frequency position of the uplink channel quality sounding pilot of the UE, the UE may not transmit the uplink channel quality sounding pilot within the uplink pilot timeslot and wait for a next time to transmit the uplink channel quality sounding pilot when no conflict exists.

Figure 1:
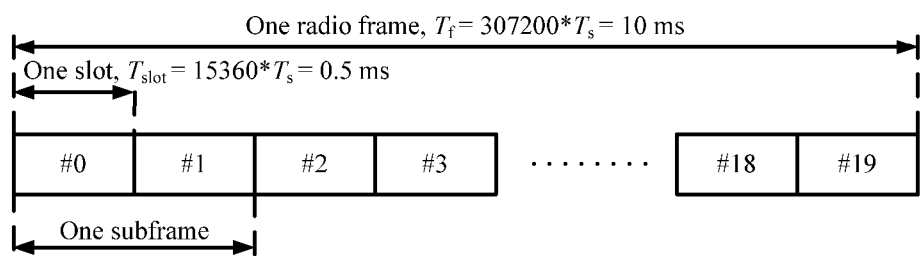
FIG. 1 is a schematic diagram of the composition of frame structure type 1 in the existing LTE system.
Figure 3:
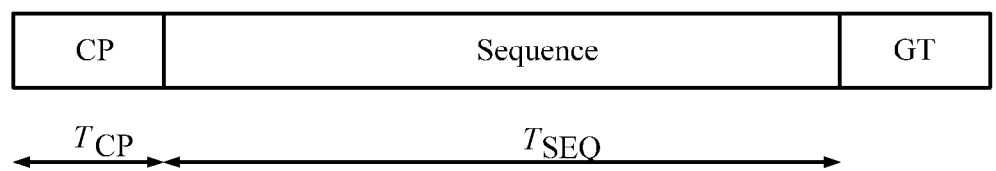
FIG. 3 is a schematic diagram of an existing random access burst structure.
Figure 2:
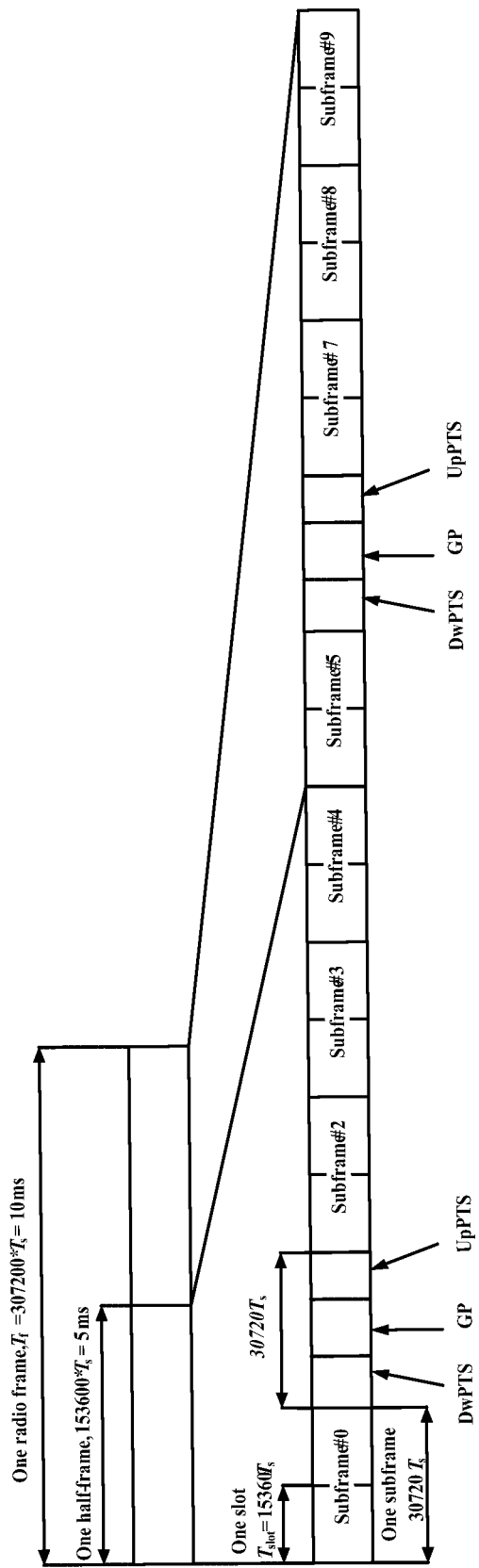
FIG. 2 is a schematic diagram of the composition of frame structure type 2 in the existing LTE system.
Figure 4:
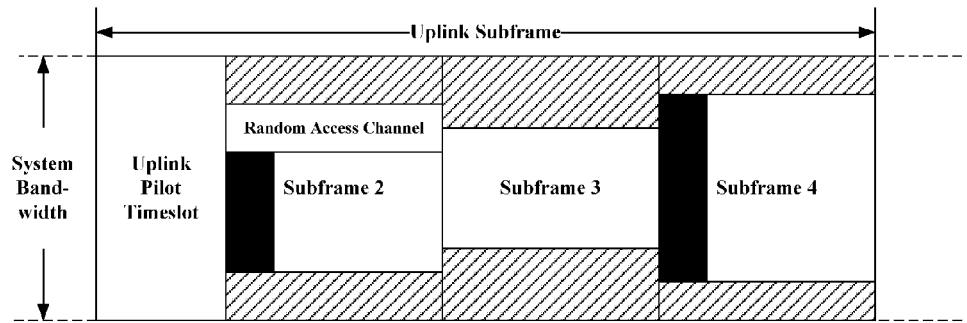
FIG. 4 is a schematic diagram of frequency band distribution of an existing uplink subframe.
Figure 5:
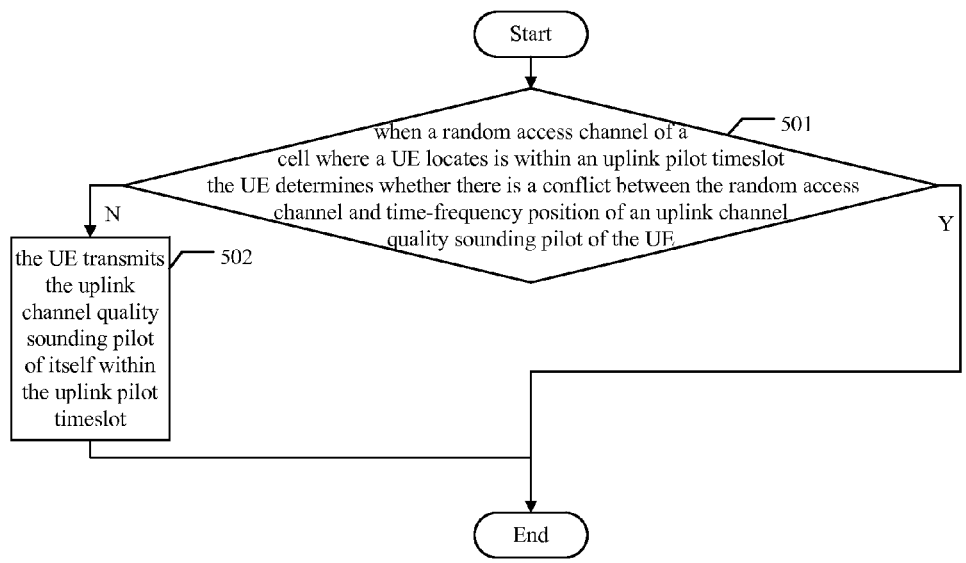
FIG. 5 is a flowchart of an uplink signal processing method according to an embodiment of the present invention.

FIG. 5 is a flowchart of an uplink signal processing method according to an embodiment of the present invention. As shown in FIG. 5, the method includes the following steps.

Step 501: when a random access channel of a cell where a user equipment (UE) locates is within an uplink pilot timeslot, the UE determines whether there is a conflict between the random access channel and time-frequency position of an uplink channel quality sounding pilot of the UE. If there is not a conflict, proceed to step 502; if there is a conflict, the uplink channel quality sounding pilot will not be transmitted by the UE within the uplink pilot timeslot, and the procedure is ended.

At this step, the random access channel of the cell where the UE locates and the uplink channel quality sounding pilot used by the UE are all pre-configured and informed to the UE by a base station. The UE can make a determination on whether the random access channel and the time-frequency position of the uplink channel quality sounding pilot of the UE conflicts after the UE knows the random access channel of its cell and the time-frequency position of its uplink channel quality sounding pilot.

Step 502: the UE transmits the uplink channel quality sounding pilot of itself within the uplink pilot timeslot, and then the procedure is ended.

Of course, at this step, other UEs within this cell will perform random access via this random access channel in accordance with an existing manner, which will not be described in detail anymore.

The scheme of the present invention is further illustrated in detail hereinafter in the following embodiments.

Figure 6:
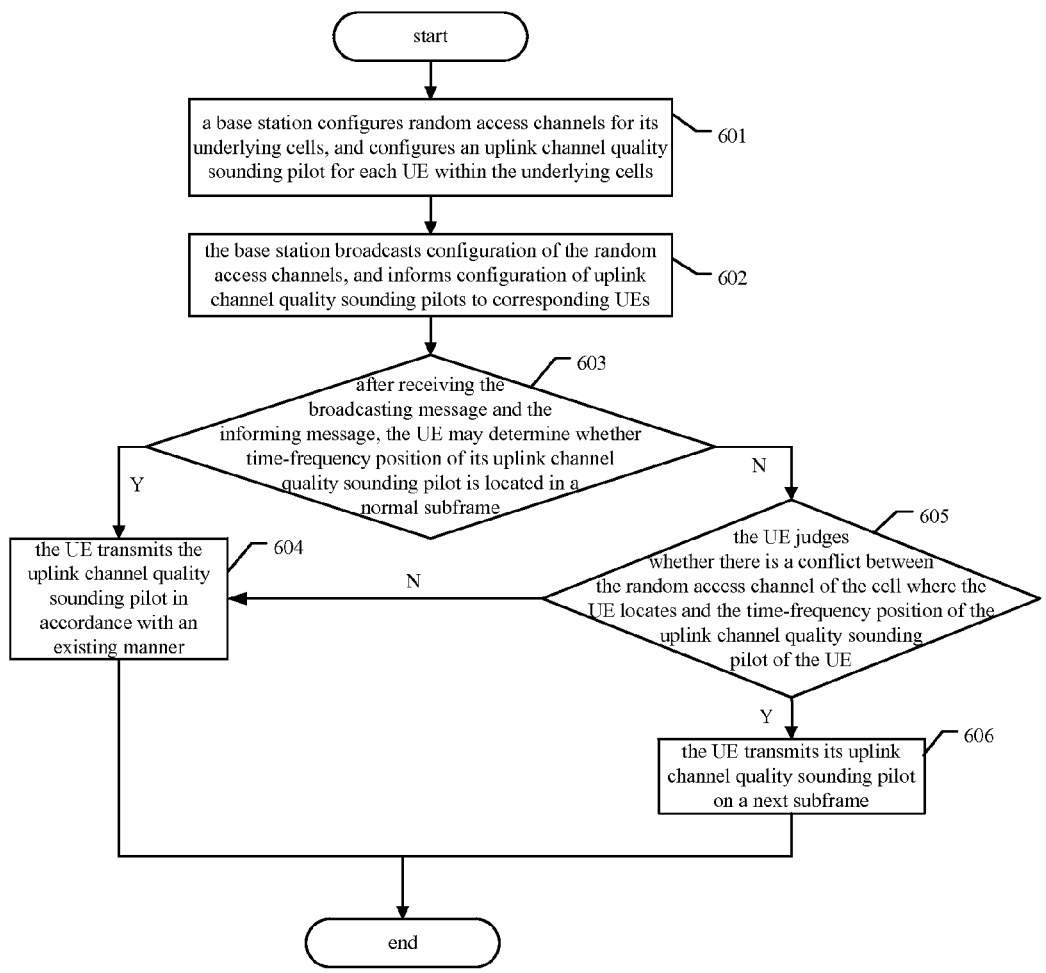
FIG. 6 is a flowchart of an uplink signal processing method according to a preferred embodiment of the present invention.

FIG. 6 is a flowchart of an uplink signal processing method according to a preferred embodiment of the present invention. As shown in FIG. 6, the method includes the following steps.

Step 601: a base station configures random access channels for its underlying cells, and configures an uplink channel quality sounding pilot for each UE within the underlying cells.

Step 602: the base station broadcasts configuration of the random access channels, and informs configuration of uplink channel quality sounding pilots to corresponding UEs.

The specific implementations of steps 601 and 602 are the same as those in the prior art, and will not be described anymore.

Step 603: after receiving the broadcasting message and the informing message, the UE may determine whether its uplink channel quality sounding pilot is located in a normal subframe, and if yes, proceed to step 604; otherwise, proceed to step 605.

Step 604: the UE transmits the uplink channel quality sounding pilot in accordance with an existing manner, and then the procedure is ended.

That is, the UE transmits the uplink channel quality sounding pilot on the corresponding time-frequency position according to the configuration of the base station.

Step 605: the UE judges whether there is a conflict between the random access channel of the cell where the UE locates and the time-frequency position of the uplink channel quality sounding pilot of the UE, if there is not a conflict, proceed to step 604; and if yes, proceed to step 606.

If the determination result of step 603 shows that the uplink channel quality sounding pilot of the UE is not located in a normal subframe, it means that the uplink channel quality sounding pilot is located in an uplink pilot timeslot. In this case, the UE may further determine whether there is a conflict between the random access channel of its cell and the time-frequency position of the uplink channel quality sounding pilot of the UE. If there is not a conflict, proceed to step 604, that is, transmit the uplink channel quality sounding pilot according to an existing manner. If there is a conflict, proceed to step 606. It is possible to refer to the prior art for knowledge of how to determine whether there is a conflict between the random access channel of its cell and the time-frequency position of the uplink channel quality sounding pilot of the UE, which will not be described in detail here.

Step 606: the UE transmits its uplink channel quality sounding pilot on a next subframe, and then the procedure is ended.

When the determination result of step 605 is that there is a conflict between the random access channel of its cell and the time-frequency position of the uplink channel quality sounding pilot of the UE, the UE may not transmit the uplink channel quality sounding pilot within the uplink pilot timeslot, in order to avoid interference to other UEs using the random access channel of the cell to perform random access.

It should be noted that a next subframe of the subframe in which the uplink pilot timeslot is located is a normal subframe. In a normal subframe, the random access channel of the cell where the UE locates and the time-frequency position of the uplink channel quality sounding pilot of the UE do not have a conflict. Therefore, the UE can transmit the uplink channel quality sounding pilot on the time-frequency position of the uplink channel quality sounding pilot within the next subframe.

In this embodiment, the random access channel of the cell where the UE locates and uplink channel quality sounding pilots of all UEs are configured by the base station. Therefore, the base station can determine within which uplink pilot timeslots the uplink channel quality sounding pilot of the UE and the random access channel of the cell where the UE locates may have a conflict. Moreover, since the UE may not transmit the uplink channel quality sounding pilot within any of the determined uplink pilot timeslots, it will be possible for the base station to merely detect the random access channel within these determined uplink pilot timeslots.

It should also be noted that the preferred embodiment shown in FIG. 6 is an example, and not for use to limit the technical scheme of the present invention. For example, in practical application, the method may further include a determination step before performing step 606, i.e., determining again whether there is a conflict between the random access channel of the cell where the UE locates and the time-frequency position of the uplink channel quality sounding pilot of the UE, and performing step 606 if there is not a conflict.

Figure 7:
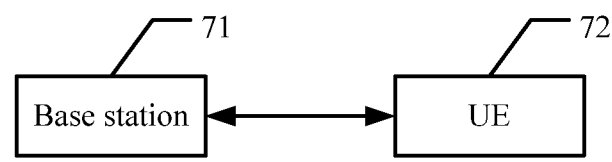
FIG. 7 is a diagram of the structure of an uplink signal processing system according to an embodiment of the present invention.

On the basis of the above mentioned method, FIG. 7 illustrates a diagram of the structure of an uplink signal processing system according to an embodiment of the present invention. As shown in FIG. 7, the system includes:

a base station 71, configured for configuring random access channels for underling cells of the base station and configuring an uplink channel quality sounding pilot for each user equipment (UE) within the underling cells, broadcasting configuration of the random access channels, and informing configuration of uplink channel quality sounding pilots to corresponding UEs 72 (for simplifying the drawing, only one UE is denoted in FIG. 7);

each of the UEs 72 is configured for determining whether there is a conflict between a random access channel of a cell where the UE locates and time-frequency position of an uplink channel quality sounding pilot of the UE when the random access channel of the cell where the UE locates is within an uplink pilot timeslot, and not transmitting the uplink channel quality sounding pilot of the UE within the uplink pilot timeslot if there is a conflict, and further transmitting the uplink channel quality sounding pilot of the UE within the uplink pilot timeslot when no conflict exists.

The UE 72 is further configured for transmitting the uplink channel quality sounding pilot of itself at a next time-frequency position of the uplink channel quality sounding pilot.

The base station 71 is further configured for determining the uplink pilot timeslot within which there is a conflict between the uplink channel quality sounding pilot of the UE 72 and the random access channel of the cell where the UE locates according to the configurations, and detecting only the random access channel within the determined uplink pilot timeslot.

Figure 8:
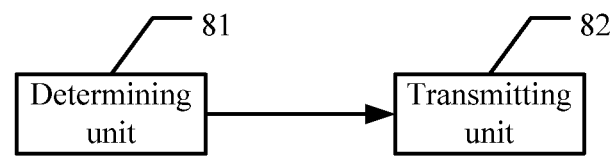
FIG. 8 is a diagram of the structure of uplink signal processing apparatus according to an embodiment of the present invention.

FIG. 8 is a diagram of the structure of uplink signal processing apparatus according to an embodiment of the present invention, wherein this apparatus is the UE 72 illustrated in FIG. 7. As shown in FIG. 8, the apparatus includes:

a determining unit 81, configured for determining whether there is a conflict between a random access channel of a cell where the apparatus locates and time-frequency position of an uplink channel quality sounding pilot of the apparatus when the random access channel is within an uplink pilot timeslot, and informing a determination result to a transmitting unit 82;

the transmitting unit 82, configured for not transmitting the uplink channel quality sounding pilot within the uplink pilot timeslot when the determination result is that there is a conflict, and further transmitting the uplink channel quality sounding pilot at a next time-frequency position of the uplink channel quality sounding pilot.

The transmitting unit 82 is further configured for transmitting the uplink channel quality sounding pilot within the uplink pilot timeslot when the determination result is that no conflict exists.

As to the specific work flow of the system and apparatus shown in FIG. 7 and FIG. 8 as embodiments, corresponding descriptions can be found in the above mentioned method embodiment, which is not repeatedly described here.

Conclusively, by adopting the technical scheme of the present invention, detection performance of a random access channel can not be disturbed by an uplink channel quality sounding pilot within an uplink pilot timeslot. That is, the detection performance of the random access channel may be increased. Meanwhile, configuration on the multiplexing of a random access channel and an uplink channel quality sounding pilot within an uplink pilot timeslot will be simplified.

To sum up, the above mentioned embodiments are only examples of the present invention, and can not be used for limiting the protection scope of the present invention. Any modifications, equivalent replacements and improvements within the spirit and principle of the present invention should be included in the protection scope of the present invention.

The invention claimed is:

1. A method for processing uplink signal, comprising:

configuring, by a base station, random access channels for its underling cells and configuring an uplink channel quality sounding pilot for each user equipment (UE) within the underling cells, broadcasting configuration of the random access channels, and informing configuration of uplink channel quality sounding pilots to corresponding UEs;

when a random access channel of a cell where a UE locates is within an uplink pilot timeslot, the UE determining whether there is a conflict between the random access channel and time-frequency position of an uplink channel quality sounding pilot of the UE; and if there is a conflict, the uplink channel quality sounding pilot will not be transmitted by the UE within the uplink pilot timeslot; and determining, by the base station according to the configurations, the uplink pilot timeslot within which there is a conflict between the random access channel of the cell where the UE locates and the time-frequency position of the uplink channel quality sounding pilot of the UE, and merely detecting the random access channel within the determined uplink pilot timeslot.

2. The method according to claim 1, further comprising:

if there is not a conflict, transmitting the uplink channel quality sounding pilot by the UE within the uplink pilot timeslot.

3. The method according to claim 1, further comprising: if there is a conflict, transmitting the uplink channel quality sounding pilot by the UE at a next time-frequency position of the uplink channel quality sounding pilot.

\* \* \* \* \*